United States Patent
Ueta et al.

(10) Patent No.: US 6,341,245 B1
(45) Date of Patent: Jan. 22, 2002

(54) MACHINE TOOL DISPLACEMENT CORRECTING APPARATUS

(75) Inventors: Toshihiro Ueta, Mishima; Kazuo Nagashima, Shizuoka-ken, both of (JP)

(73) Assignee: Toshiba Kikai Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/101,275

(22) PCT Filed: Jan. 8, 1997

(86) PCT No.: PCT/JP97/00016

§ 371 Date: Jul. 8, 1998

§ 102(e) Date: Jul. 8, 1998

(87) PCT Pub. No.: WO97/25183

PCT Pub. Date: Jul. 17, 1997

(30) Foreign Application Priority Data

Jan. 9, 1996 (JP) ............................................. 8-001418

(51) Int. Cl.[7] .............................................. G06F 19/00
(52) U.S. Cl. ..................... 700/194; 700/193; 700/245; 318/564; 318/567; 360/73; 409/80
(58) Field of Search ................................. 700/194, 193, 700/245, 195; 409/80, 79, 132, 147, 193; 318/569, 567, 560; 360/77.04; 369/44

(56) References Cited

U.S. PATENT DOCUMENTS 4,143,309 A * 3/1979 Patterson ..................... 318/807
4,775,926 A * 10/1988 Hasegawa et al. ...... 364/167.01
5,099,640 A * 3/1992 Kobayashi et al. ............ 57/264
5,111,590 A * 5/1992 Park .............................. 33/502
5,535,183 A * 7/1996 Miura et al. ................... 369/32
5,550,685 A * 8/1996 Drouin ...................... 360/77.08
5,793,221 A * 8/1998 Aoki ............................. 324/65

FOREIGN PATENT DOCUMENTS

JP       5-277894       * 10/1993
JP       7-223146       *  8/1995

* cited by examiner

Primary Examiner—Ayaz Sheikh
Assistant Examiner—Firmin Backer
(74) Attorney, Agent, or Firm—Finnegan, Henderson, Farabow, Garrett, & Dunner, L.L.P.

(57) ABSTRACT

A history of function values of a spindle rotation frequency in each time period from present to past is stored in a data table 22D and corrective coefficients are stored in advance in a corrective coefficient table 22C relating the coefficients to the location in the data table 22D. Each location and corrective coefficient are read out from the corrective coefficient table 22C and the function value of the spindle rotation frequency corresponding to the location is read out from the data table 22D. The compensation value is calculated from the total sum of each product of the function value and the corrective coefficient in each location and compensate the NC command position with the compensation value.

8 Claims, 8 Drawing Sheets

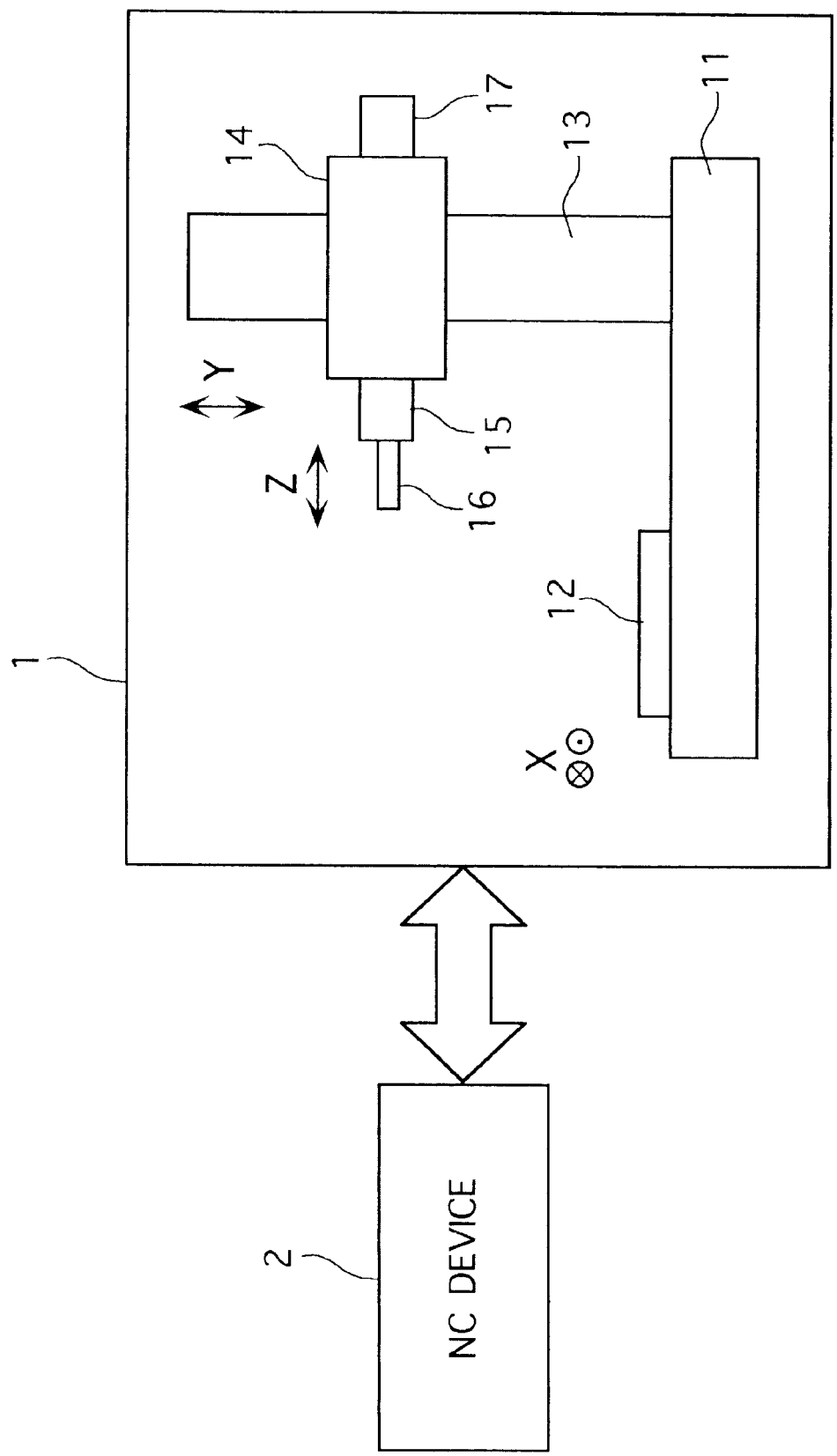

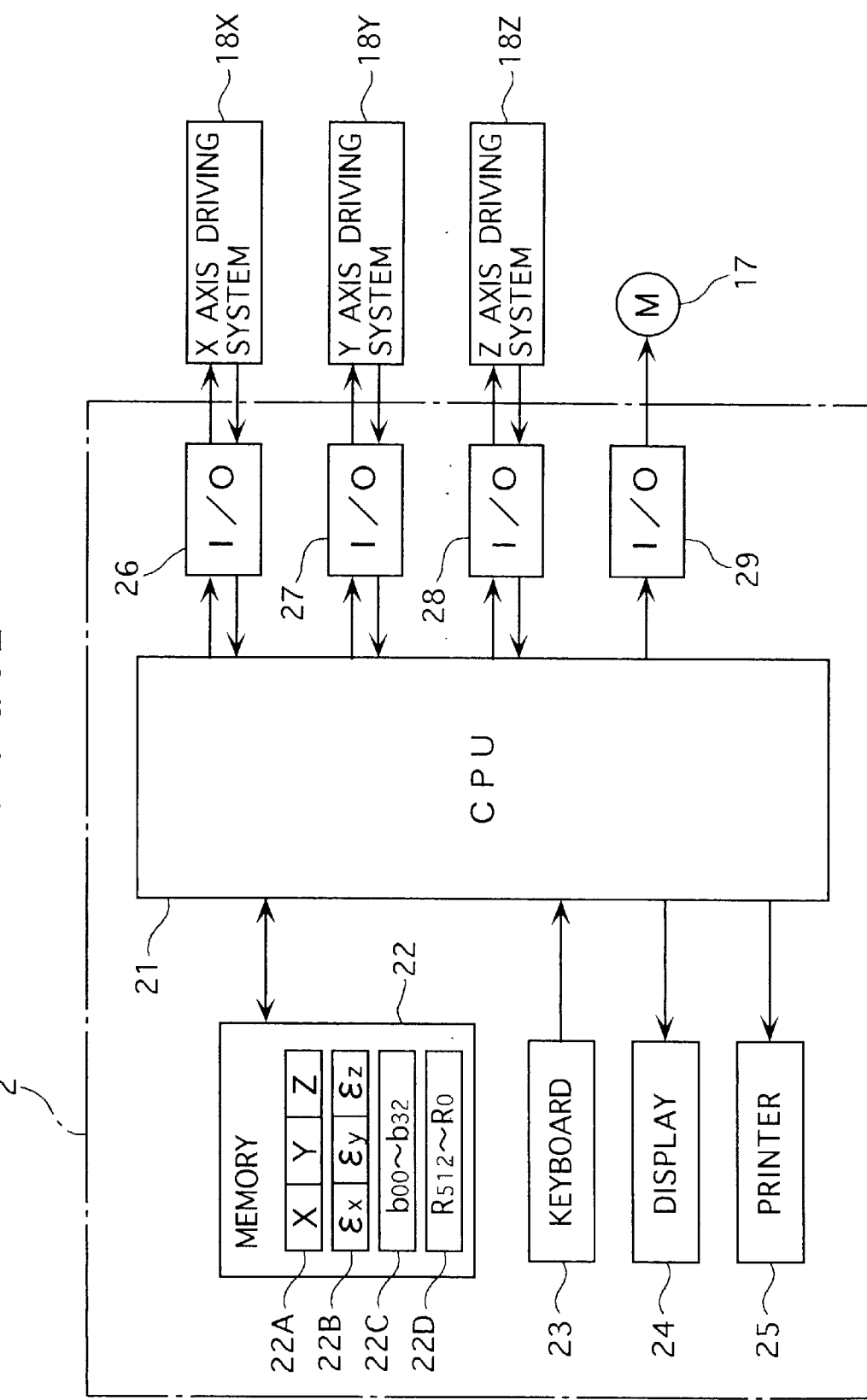

FIG. 3

| ADDRESS k | ELAPSED TIME | X AXIS CORRECTIVE COEFFICIENT | | Y AXIS CORRECTIVE COEFFICIENT | | Z AXIS CORRECTIVE COEFFICIENT | |
|---|---|---|---|---|---|---|---|
| [512] | X0 | $b_{00x}$ | -2687 | $b_{00y}$ | -1080 | $b_{00z}$ | 7450 |
| [511] | X1 | $b_{01x}$ | 2525 | $b_{01y}$ | 425 | $b_{01z}$ | -6467 |
| [510] | X2 | $b_{02x}$ | 1178 | $b_{02y}$ | -206 | $b_{02z}$ | -3456 |
| [509] | X3 | $b_{03x}$ | 503 | $b_{03y}$ | 152 | $b_{03z}$ | -1316 |
| [508] | X4 | $b_{04x}$ | 203 | $b_{04y}$ | 773 | $b_{04z}$ | -1676 |
| [506] | X5~X6 | $b_{05x}$ | 223 | $b_{05y}$ | 2000 | $b_{05z}$ | -3120 |
| [504] | X7~X8 | $b_{06x}$ | 189 | $b_{06y}$ | 1792 | $b_{06z}$ | -2986 |
| [502] | X9~X10 | $b_{07x}$ | -11 | $b_{07y}$ | 1491 | $b_{07z}$ | -2527 |
| [500] | X11~X12 | $b_{08x}$ | -30 | $b_{08y}$ | 1257 | $b_{08z}$ | -2506 |
| [496] | X13~X16 | $b_{09x}$ | -500 | $b_{09y}$ | 2023 | $b_{09z}$ | -3748 |
| [492] | X17~X20 | $b_{10x}$ | 412 | $b_{10y}$ | 1621 | $b_{10z}$ | -2516 |
| [488] | X21~X24 | $b_{11x}$ | 0 | $b_{11y}$ | 1296 | $b_{11z}$ | -2242 |
| [480] | X25~X32 | $b_{12x}$ | -55 | $b_{12y}$ | 2002 | $b_{12z}$ | -3657 |
| [472] | X33~X40 | $b_{13x}$ | -210 | $b_{13y}$ | 2302 | $b_{13z}$ | -3016 |
| [464] | X41~X48 | $b_{14x}$ | -427 | $b_{14y}$ | 1825 | $b_{14z}$ | -2791 |
| [456] | X49~X56 | $b_{15x}$ | -535 | $b_{15y}$ | 1274 | $b_{15z}$ | -2522 |
| [448] | X57~X64 | $b_{16x}$ | -582 | $b_{16y}$ | 573 | $b_{16z}$ | -2088 |
| [432] | X65~X80 | $b_{17x}$ | -108 | $b_{17y}$ | 2337 | $b_{17z}$ | -3423 |
| [416] | X81~X96 | $b_{18x}$ | -17 | $b_{18y}$ | 1607 | $b_{18z}$ | -3187 |
| [400] | X97~X112 | $b_{19x}$ | 256 | $b_{19y}$ | 1483 | $b_{19z}$ | -2836 |
| [384] | X113~X128 | $b_{20x}$ | 204 | $b_{20y}$ | 1011 | $b_{20z}$ | -2562 |
| [352] | X129~X160 | $b_{21x}$ | 325 | $b_{21y}$ | 1651 | $b_{21z}$ | -4548 |
| [320] | X161~X192 | $b_{22x}$ | 251 | $b_{22y}$ | 1277 | $b_{22z}$ | -4287 |
| [288] | X193~X224 | $b_{23x}$ | 209 | $b_{23y}$ | 905 | $b_{23z}$ | -4090 |
| [256] | X225~X256 | $b_{24x}$ | 161 | $b_{24y}$ | 891 | $b_{24z}$ | -3661 |
| [224] | X257~X288 | $b_{25x}$ | 120 | $b_{25y}$ | 800 | $b_{25z}$ | -3200 |
| [192] | X289~X320 | $b_{26x}$ | 100 | $b_{26y}$ | 700 | $b_{26z}$ | -2800 |
| [160] | X321~X352 | $b_{27x}$ | 80 | $b_{27y}$ | 600 | $b_{27z}$ | -2500 |
| [128] | X353~X384 | $b_{28x}$ | 60 | $b_{28y}$ | 500 | $b_{28z}$ | -2200 |
| [96] | X385~X416 | $b_{29x}$ | 40 | $b_{29y}$ | 400 | $b_{29z}$ | -2000 |
| [64] | X417~X448 | $b_{30x}$ | 30 | $b_{30y}$ | 300 | $b_{30z}$ | -1600 |
| [32] | X449~X480 | $b_{31x}$ | 20 | $b_{31y}$ | 200 | $b_{31z}$ | -1200 |
| [0] | X481~X512 | $b_{32x}$ | 10 | $b_{32y}$ | 100 | $b_{32z}$ | -600 |

FIG. 5

| ADDRESS | ELAPSED TIME | FUNCTIONAL VALUE | |
|---|---|---|---|
| [512] | X0 | $R_{512}$ 5104 | |
| [511] | X1 | . 5104 | |
| [510] | X2 | . 5104 | |
| [509] | X3 | . 5104 | |
| [508] | X4 | 5104 | →A2 |
| [507] | X5 | 1026 | →+A2=6130 |
| [506] | X5~X6 | 1026 | ← ÷2 |
| [505] | X6~X7 | 1026 | |
| [504] | X7~X8 | 1026 | |
| .... | .... | .... | |
| [499] | X12~X13 | 1026 | →A4 |
| [498] | X13~X14 | 1026 | |
| [497] | X14~X15 | 1026 | →+A4=2052 |
| [496] | X13~X16 | 1026 | ← ÷2 |
| [495] | X14~X17 | 1026 | |
| .... | .... | .... | |
| [486] | X23~X26 | 1026 | |
| [485] | X24~X27 | 1026 | →A8 |
| [484] | X25~X28 | 1026 | |
| [483] | X26~X29 | 1026 | |
| [482] | X27~X30 | 1026 | |
| [481] | X28~X31 | 1026 | →+A8=2052 |
| [480] | X25~X32 | 1026 | ← ÷2 |
| [479] | X26~X33 | 1026 | |
| .... | .... | .... | |
| [471] | X34~X41 | 128 | |
| [470] | X35~X42 | 0 | |
| [469] | X36~X43 | 0 | |
| .... | .... | .... | |
| [442] | X63~X70 | 0 | |
| [441] | X64~X71 | 0 | →A16 |
| [440] | X65~X72 | 0 | |
| .... | .... | .... | |
| [434] | X71~X78 | 0 | |
| [433] | X72~X79 | 0 | →+A16=0 |
| [432] | X65~X80 | 0 | ← ÷2 |
| .... | .... | .... | |
| [370] | X127~X142 | 0 | |
| [369] | X128~X143 | 0 | →A32 |
| [368] | X129~X144 | 0 | |
| .... | .... | .... | |
| [354] | X143~X158 | 0 | |
| [353] | X144~X159 | . 0 | →+A32=0 |
| [352] | X129~X160 | . 0 | ← ÷2 |
| .... | .... | . .... | |
| [0] | X481~X512 | $R_0$ 0 | |

| ADDRESS | ELAPSED TIME | FUNCTIONAL VALUE | |
|---|---|---|---|
| [512] | X0 | $R_{512}$ | 5104 |
| [511] | X1 | : | 5104 |
| [510] | X2 | : | 5104 |
| [509] | X3 | . | 5104 |
| [508] | X4 | | 5104 |
| [507] | X5 | | 5104 |
| [506] | X5~X6 | | 3065 |
| [505] | X6~X7 | | 1026 |
| [504] | X7~X8 | | 1026 |
| .... | .... | | .... |
| [499] | X12~X13 | | 1026 |
| [498] | X13~X14 | | 1026 |
| [497] | X14~X15 | | 1026 |
| [496] | X13~X16 | | 1026 |
| [495] | X14~X17 | | 1026 |
| .... | .... | | .... |
| [486] | X23~X26 | | 1026 |
| [485] | X24~X27 | | 1026 |
| [484] | X25~X28 | | 1026 |
| [483] | X26~X29 | | 1026 |
| [482] | X27~X30 | | 1026 |
| [481] | X28~X31 | | 1026 |
| [480] | X25~X31 | | 1026 |
| [479] | X26~X33 | | 1026 |
| .... | .... | | .... |
| [471] | X34~X41 | | 256 |
| [470] | X35~X42 | | 128 |
| [469] | X36~X43 | | 0 |
| .... | .... | | .... |
| [442] | X63~X70 | | 0 |
| [441] | X64~X71 | | 0 |
| [440] | X65~X72 | | 0 |
| .... | .... | | .... |
| [434] | X71~X78 | | 0 |
| [433] | X72~X79 | | 0 |
| [432] | X65~X80 | | 0 |
| .... | .... | | .... |
| [370] | X127~X142 | | 0 |
| [369] | X128~X143 | | 0 |
| [368] | X129~X144 | | 0 |
| .... | .... | | .... |
| [354] | X143~X158 | | 0 |
| [353] | X144~X159 | : | 0 |
| [352] | X129~X160 | : | 0 |
| .... | .... | : | .... |
| [0] | X481~X512 | $R_0$ | 0 |

← 22D

MACHINE TOOL DISPLACEMENT CORRECTING APPARATUS

TECHNICAL FIELD

The present invention relates to a displacement compensation apparatus for machine tools to compensate displacement resulting from centrifugal force and heat generation caused by spindle rotation in a machine tool.

BACKGROUND ART

Conventionally, an apparatus to compensate heat displacement of a spindle based on temperature changes on the spindle is known as a heat displacement compensation apparatus to compensate heat displacement resulting from heat generation caused by rotation of the spindle in the machine tool.

In the above displacement compensation apparatus, compensation a correlation between the displacement of the spindle and a difference in temperature between places where a heat displacement is most likely to occur and where change in temperature is relatively small is examined in advance, for instance, a difference in temperature between near the spindle and the bed. A compensation value corresponding to the difference in temperature is calculated from the correlation, and the heat displacement is compensated based on the compensation value. But the conventional compensation method of heat displacement has a disadvantage that a difference is often found between an actual heat displacement of a spindle and a compensation value derived from the compensation calculation based on the difference in temperature, when the spindle is rotated at a random rotation frequency.

It is clear from FIG. 8 that a large deviation is found between a measured value and a compensation value obtained from the conventional compensation calculation, when the displacement of the spindle is measured after the spindle is rotated at rotation frequencies of, for instance, 1000 rpm, 3000 rpm, 0 (suspension), 2000 rpm, 3000 rpm, 1000 rpm for each 40 minutes and after leaving in suspension for 120 minutes.

When a spindle rotates, the spindle is expanded by centrifugal force. There is a disadvantage that an expansion of a spindle by centrifugal force makes the spindle shorten affected by the Poisson's effect, so that the position of the tool retreats to that extent from the product in process.

In the conventional heat displacement compensation method, as the compensation value is determined by the difference in temperature, it is impossible to compensate instant displacement caused by a change in the rotation frequency of the spindle.

The object of the present invention is to provide a displacement compensation apparatus for machine tools to precisely compensate displacement resulting from centrifugal force or heat generation caused by rotating spindle rotation even when the spindle is randomly rotated.

DISCLOSURE OF THE INVENTION

A displacement compensation apparatus for machine tools according to the present invention is to compensate a displacement resulting from centrifugal force and heat generation caused by rotation of a spindle in a machine tool. The apparatus is provided with; a historical data table storing a history of function values of rotation frequency of the spindle in each time period from present to past; a corrective coefficient table in which corrective coefficients are stored in advance relating the coefficients to the corresponding location in the historical data table and a compensation process means. The compensation process means reads out each location and each corrective coefficient which corresponds to the location from the corrective coefficient table and concurrently reads out a function value for the rotation frequency of the spindle at the corresponding location from the historical data table, calculates a compensation value from the function value at each location and the corresponding corrective coefficient, and compensates a commanded position of each shaft in the machine tool based on the compensation values.

The corrective coefficient is determined by collecting and storing measured data on displacement of the spindle, shaft rotation time data and rotation frequency data when the spindle is randomly rotated with changing the shaft rotation frequency and by processing a regression calculation based on these data.

The function value of the rotation frequency of the spindle is a value proportional to the square of the spindle rotation frequency, or a value based on the proportional value to the square of the spindle rotation frequency, with compensation by other value.

For instance, the function value is obtained from dividing a square of the rotation frequency of the spindle by 16384 and subtracting one tenth of the rotation frequency of the spindle. The number thus derived is used as the function value. The equation is expressed as follows.

$$\text{Functional equation} = (\text{rotation frequency} \times \text{rotation frequency}/16384) - 0.1 \times \text{rotation frequency} \quad (1)$$

In another example, a function value is calculated as a square of the rotation frequency of the spindle is divided by 16384 and further divided by one plus a number of three times of inverse of the natural logarithm of the rotation frequency divided by 25000. The functional equation is expressed as follows.

$$\text{Functional equation} = (\text{rotation frequency} \times \text{rotation frequency}/16384/(1.0+3.0/\exp(\text{rotation frequency}/25000))) \quad (2)$$

In general, as centrifugal force is proportional to a square of a rotation frequency of a spindle, a displacement which is proportional to centrifugal force is also proportional to a square of the rotation frequency of the spindle. And as long as a force acting on the spindle and a friction coefficient stay constant, the friction torque is in proportion to the rotation frequency of the spindle. As friction is a product of friction torque and rotation frequency, it is proportional to a square of the rotation frequency of the spindle. Heat generation is a result of consumed energy by friction, it is also proportional to a square of the rotation frequency of the spindle. Hence, when a value which is proportional to a square of a spindle rotation frequency is used as a function value of the spindle rotation frequency, the accuracy of compensation can be improved.

In actuality, as a force acting on the spindle tends to increase with the increase of the rotation frequency, beat generation changes more sharply than a proportion to a square of the rotation frequency of the spindle. Consequently, as a function value for the rotation frequency of the spindle, a number proportional to a square of the spindle rotation frequency as a main component and compensated by another number is used. Then the accuracy of compensation is much improved.

In compensating displacement, each stored location and corrective coefficient are read out from the corrective coefficient, concurrently the function value of the spindle rotation frequency in each location is read out from the historical data table. And the compensation value is calculated from the function value in each location and the corresponding corrective coefficient.

Now, each location which is read out from the corrective coefficient table is taken as $k_{00}$, $k_{01}$, $k_{02}$, ... $k_m$, and corresponding each corrective coefficient as $b_{00}$, $b_{01}$, $b_{02}$, ... $b_m$. And the function value of the spindle rotation frequency at each location read out from the historical data table is taken as $R(k_{00})$, $R(k_{01})$, $R(k_{02})$, ... $R(k_m)$, then the displacement amounts $\delta$ is calculated from the following equation.

$$\delta = R(k_{00}) \times b_{00} + R(k_{01}) \times b_{01} + R(k_{02}) \times b_{02} \ldots + R(k_m) \times b_m \quad (3)$$

The compensation value $\epsilon$ is obtained by changing the signs of the displacement amount $\delta$.

More specifically, as the corrective coefficient value obtained from the equation (3) is very small, 4194304 times of the corrective coefficient value is stored and the displacement amount $\delta$ is obtained from dividing the calculated value by 4194304.

For instance, when compensating three axes X, Y and Z, the location read out from the corrective coefficient table are expressed as $k_{00}$, $k_{01}$, $k_{02}$ ... $k_m$ the corrective coefficient in X axis corresponding to the above location are $b_{00x}$, $b_{01x}$, $b_{02x}$, ... $b_{mx}$, the corrective coefficient in Y axis corresponding to the location are $b_{00y}$, $b_{01y}$, $b_{02y}$, ... $b_{my}$, and the corrective coefficient in Z axis are $b_{00z}$, $b_{01z}$, $b_{02z}$, ... $b_{mz}$. And the function values of rotation frequency of the spindle at each location read out from the historical data table are expressed as $R(k_{00})$, $R(k_{01})$, $R(k_{02})$, ... $R(k_m)$. The displacement amounts for each axis $\delta_x$, $\delta_y$, $\delta_z$ can be obtained by the following equations. $\delta_x = (R(k_{00}) \times b_{00x} + R(k_{01}) \times b_{01x} + R(k_{02}) \times b_{02x} \ldots R(k_m) \times b_{mx})/4194304$ $$\delta_y = (R(k_{00}) \times b_{00y} + R(k_{01}) \times b_{01y} + R(k_{02}) \times b_{02y} \ldots R(k_m) \times b_{my})/4194304$$

$$\delta_z = (R(k_{00}) \times b_{00y} + R(k_{01}) \times b_{01y} + R(k_{02}) \times b_{02y} \ldots R(k_m) \times b_{my})/4194304 \quad (4)$$

A compensation value is a value of which absolute number is the same as the displacement amount and which is shown in opposite signs. Therefore, compensation values for the axes (X, Y, and Z axis) $\epsilon_x$, $\epsilon_y$, $\epsilon_z$, are obtained from the following equation.

$$\epsilon_x = -\delta_x, \epsilon_y = -\delta_y, \epsilon_z = -\delta_z \quad (5)$$

Accordingly, the compensation value is calculated from the corrective coefficient considering the rotation time, rotation frequency, elapsed time of the spindle, and the function value of the spindle rotation frequency. As the command position of the machine tool is compensated based on the compensation value, the displacement resulting from centrifugal force caused by the rotation of the spindle or heat generation spindle can be compensated with high accuracy even when the spindle is randomly rotated.

That is, in a conventional compensation method, the compensation value is calculated based on a temperature difference at that time. When the spindle is randomly rotated, the compensation value for heat displacement of the spindle varies from small number to big number. And it is impossible to compensate the displacement resulting from changes in rotation frequency of the spindle. But the apparatus according to the present invention gives a compensation value having little difference from the true displacement of the spindle even when the spindle is rotating at a random speed and also compensates a displacement caused by centrifugal force. Thus the apparatus according to the present invention can achieve highly accurate compensation.

It is preferable that the function values are stored in the data table at relatively short time intervals while the spindle is rotating and at relatively long time intervals while the spindle is halted. For instance, the function values are stored at intervals from 20 seconds to one minute while the spindle is rotating and stored at intervals from one minute to 3 minutes while the spindle is halted.

In this way, a precise compensation of the displacement can be achieved with a single table while the spindle is rotated and also while the spindle is halted. Incidentally, displacement characteristics of the spindle in rotation is different from displacement characteristics of the spindle in suspension. If the function values are renewed and stored still at the same time intervals, the compensation value derived may contain some error. This may be considered as a disadvantage of the method. But the method according to the present invention ensures an accurate compensation of the displacement with one table for both in rotation and in suspension of the rotation of the spindle.

It is also preferable that the locations in the data table are arranged in an order reverse to elapsed time.

Most of presently available micro processing units for the computer (it will be abbreviated to MPU hereafter) are provided with a batch transfer function of its memory contents. It takes shorter time for carrying out processing with the batch transfer function provided in the MPU than to make and use programs of reading out individual data from a source address and writing in a destination address. But in this function, the processing is sequentially carried out from an address of a lower order to higher order. Accordingly, when the range of address in source address is overlapped with the range of address in destination address and if the destination address is in higher order than the order of the source address, the overlapped range area can not be processed correctly. In the present invention, as the locations in the data table are arranged in an order reverse to elapsed time, the above described problem can be avoided.

Moving averages("ryu-do heikin" in Japanese) of the function values of predetermined plural locations in the past time period may be stored in the data table at the time of data renewal, and one corrective coefficient value in correspondence to the time period above described may be stored in the corrective coefficient table.

Then, the size (the number of lines) of the corrective coefficient table can be reduced and the speed for the compensation calculation can be improved.

For the value stored in the historical data table, the rotation frequency of the spindle itself can be used instead of the function value of the spindle rotation frequency.

In such cases, the compensation procedure is as follows. A location in the historical data table and the corresponding corrective coefficient are read out from the corrective coefficient table and at the same time the rotation frequency of the spindle in the location is read out from the historical data table. The function values are calculated from the rotation frequencies of the spindle in the locations as necessary. And with the corresponding corrective coefficients the calculations of the corrective values are carried out. Then, the commanded position for each shaft of the machine tool is compensated based on the corrective values.

BRIEF DESCRIPTION OF DRAWINGS

FIG. 1 is a block diagram of the processing system showing an embodiment of the displacement compensation apparatus relating to the present invention;

FIG. 2 is a block diagram of a numeric control system for the above embodiment;

FIG. 3 is a corrective coefficients table for the above embodiment;

FIG. 5 is a historical data table for the above embodiment;

FIG. 6 is a table after renewal of the historical data table for the above embodiment;

BEST MODE FOR CARRYING OUT THE INVENTION

Figure 4:
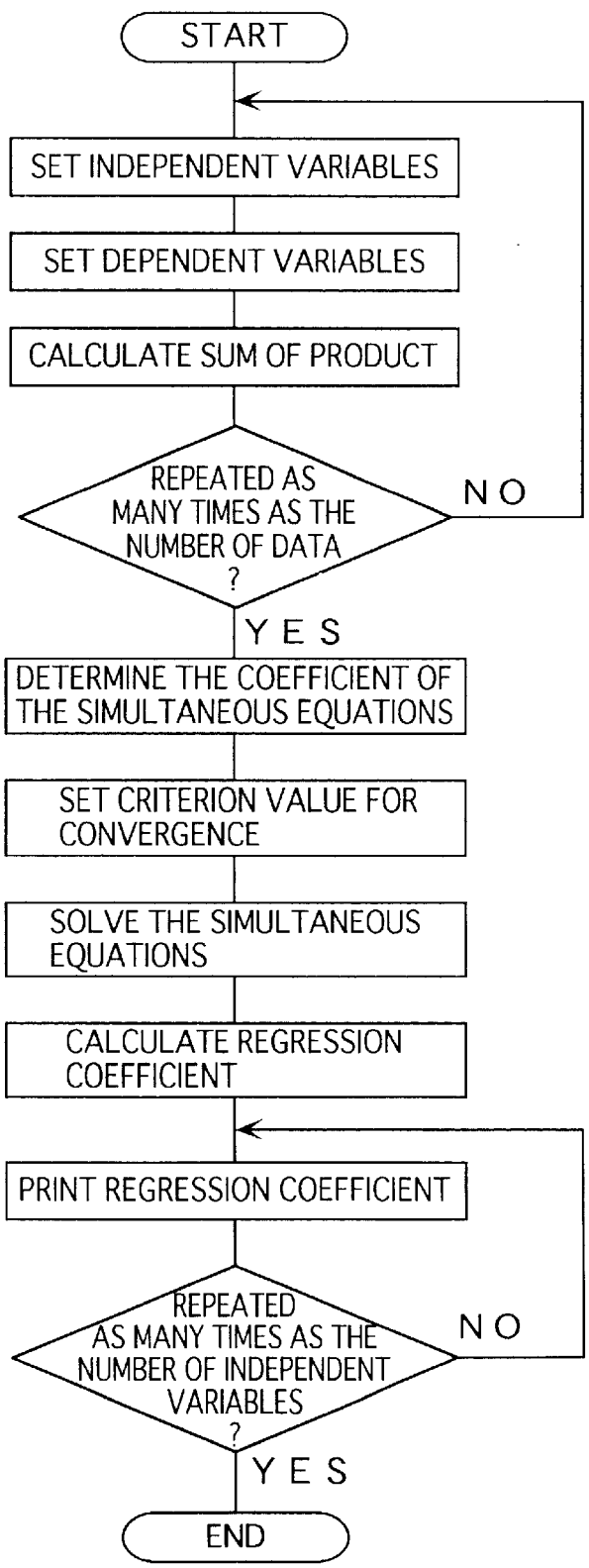
FIG. 4 is a block diagram showing the method of computations for the corrective coefficient in the above embodiment.

An embodiment of the present invention will now be explained in detail with reference to the drawings.

FIG. 1 shows a processing system of the displacement compensation apparatus of the present invention. The processing system consists of a horizontal boring machine 1 as a machine tool and a numeric control unit 2 which controls the horizontal boring machine and also carries out the operation of compensation.

The horizontal boring machine is constituted by a bed 11, a table provided on the bed 11 in a movable manner along the X-axis (directions intersecting at right angles with the paper surface of FIG. 1), a column 13 mounted and firmly fixed on the bed 11, a spindle head 14 provided to the column 13 in a movable manner up and down along the Y-axis (the top and the bottom directions on FIG. 1), a ram 15 provided to the spindle head 14 in a reciprocally movable manner along the Z-axis directions (right and left directions on FIG. 1) and a spindle 16 accommodated in the ram in a rotatable manner. Incidentally, the designation 17 is a motor driving the spindle 16.

The numerical control unit 2 is provided with a CPU 21, a memory 22 which stores various programs and data, a keyboard 23, a display 24, a printer 25, and I/O 26, 27, 28, 29 as shown in FIG. 2. Each I/O 26, 27, 28 is connected to the actuating systems toward X, Y, Z axis directions of the horizontal boring machine, 18X, 18Y, 18Z and the I/O 29 is connected with the motor 17. The CPU 21 controls movements of the actuating systems toward X, Y, Z directions 18X, 18Y, and 18Z and performs compensation processing. Thus, the CPU 22 also serves as a compensation processing means.

The memory 22 is provided with not only a memory area for storing various processing programs (not shown in figures), but also a coordinate value table 22A which stores coordinate values of each axis (X, Y, Z), a compensation value table 22B which stores compensation values $\epsilon_x$, $\epsilon_y$, $\epsilon_z$ of each axis (X, Y, Z), a data table 22D which stores a history of function values of the rotation frequency of the spindle on the machine tool in each time period from present to past and a corrective coefficient table 22C which stores, in advance, corrective coefficients of each axes (X, Y, Z) relating the coefficients to the addresses of the data table 22D.

The registration of the function value and the renewal of the history in the data table 22D are carried out at intervals of 20 seconds to 3 minutes. More specifically, the registration and renewal are carried out at intervals of 20 seconds to 1 minute when the spindle is rotating, and from 1 minute to 3 minutes when the rotation of the spindle is suspended. Thus, the history of the function values stored in the data table 22D is memorized at intervals of a relatively short period of time while the spindle is rotating and at intervals of a relatively long period of time while the rotation of the spindle is suspended.

Here, FIG. 5 and FIG. 6 show the historical data table 22D. For convenience of explanation, assuming that the intervals of the registration and renewal for the whole period is one minute, the elapsed time is recorded in the elapsed-time column on FIG. 5 and FIG. 6. As a matter of fact, the elapsed time varies according to rotation or suspension of the spindle, the actual elapsed time is not always the same as shown in the figures.

Then, the randomly changeable elapsed time on the historical data table 22D is each defined as X1, X2, X3, . . . X512.

As shown in FIG. 3, in relation to the addresses from $k_{512}$ to $k_{00}$ (hereafter, they may be sometimes written as "from 512 to 0") in the data table 22D, the corrective coefficient of each axis in each time period for every cycle of renewal from present to X4 ago, $(b_{00x}, b_{00y}, b_{00z}) (b_{01x}, b_{01y}, b_{01z}) \ldots (b_{04x}, b_{04y}, b_{04z})$
are stored in the corrective coefficient table 22C.

From X4 through X12 ago, the corrective coefficient of each axis in each time period at intervals of X2, $(b_{05x}, b_{05y}, b_{05z}) (b_{06x}, b_{06y}, b_{06z}) \ldots (b_{08x}, b_{08y}, b_{08z})$
are stored.

From X12 through X24 ago, the corrective coefficient of each axis in each time period at intervals of X4, $(b_{09x}, b_{09y}, b_{09z}) (b_{10x}, b_{10y}, b_{10z}) (b_{11x}, b_{11y}, b_{11z})$
are stored.

From X24 through X64 ago, the corrective coefficient of each axis in each time period at intervals of X8, $(b_{12x}, b_{12y}, b_{12z}) (b_{13x}, b_{13y}, b_{13z}) \ldots (b_{16x}, b_{16y}, b_{16z})$
are stored.

From X64 through X128 ago, the corrective coefficient of each axis in each time period at intervals of X16, $(b_{17x}, b_{17y}, b_{17z}) (b_{18x}, b_{18y}, b_{18z}) \ldots (b_{20x}, b_{20y}, b_{20z})$
are stored.

From X128 through X512 ago, the corrective coefficient of each axis in each time period at intervals of X32, $(b_{21x}, b_{21y}, b_{21z}) (b_{22x}, b_{22y}, b_{22z}) \ldots (b_{32x}, b_{32y}, b_{32z})$
are stored.

In this point, the way to obtain the corrective coefficient stored in the corrective coefficient table 22C is explained.

First, measured displacement values of top end portion of the spindle 16, rotation time and rotation frequencies of the spindle 16 are collected as data through experiments. In this point, in order to make clear the relation between heat generation and heat emission of the machine, the rotation frequency of the spindle 16 is randomly changed (increasing or decreasing the rotation frequency).

For instance, the spindle 16 is rotated at a speed of 5000 rpm for 30 minutes, 10000 rpm for an hour, 8000 rpm for 30 minutes, 15000 rpm for an hour, 5000 rpm for30 minutes and 15000 rpm for 30 minutes before it is stopped. The observation begins before the rotation is started and continues even after the rotation is halted until the displacement is substantially recovered without interruption.

During the observation, the displacements of the spindle 16 in the X, Y, Z directions are measured at predetermined time intervals (for instance, every 30 seconds) and stored with the spindle rotation frequencies and the time of the measurement.

Then, based on the data, each corrective coefficient is determined after a multiple regression analysis.

Incidentally, the calculation of the multiple regression analysis is carried out through the procedures shown in FIG. 4.

Initially, the function values of the spindle rotation frequency are set as independent variables. Here, as the amounts of change for one time period in latest several times is large, a function value is set for each time period during the latest several periods as an independent variable. After the elapsed time exceeds X5, as the amount of change for each time period becomes a little slow, an average of the function values of the spindle rotation frequency between X2 is taken as an independent variable. When the elapsed time exceeds X12, the change for each time becomes slower, then an average of the function values of the spindle rotation frequency between X4is set as independent variable. Thus the time period for taking an average is extended according to the change in displacement amount that gets slow with lapse of time. At last, an average between X32 from X481 to X512 is taken as the thirty-third independent variable.

The reason for using an average value of the function values as independent variable is; 1. to reduce the number of the independent variables and 2. to prevent confounding between the independent variables.

In other words, when the number of the independent variables is large, the simultaneous equations with corresponding number of the independent variables are required to be solved. Under present processing circumstances of using a floating decimal, so-called double precision, the number of independent variables over seventy makes the calculation suddenly difficult. The number of the independent variables of thirty-three is about half of this number seventy and makes no problem.

Incidentally, the word "confounding" is used for a situation that a degree of correlation between independent variables becomes stronger than the correlation between the independent variable and the dependent variable. When the confounding occurs, a regression coefficient varies on a large scale with slight change in the data value. In the extreme, solutions to the simultaneous equations may not be obtained.

After setting measured values of the spindle displacement as dependent variables, sum of products calculation is carried out. That is, for each independent variable and dependent variable, the sum and average are respectively calculated, and the sum of products are obtained in each relations. The procedure is repeated as many times as the number of the data.

Next, sum of products is calculated after data of the sum of products is compensated by data of the sum. Then, coefficients of the simultaneous equations are determined. And after establishing criterion values for convergence, the simultaneous equations are solved through Gauss's Law of Discharge(sweeping. "Gausu-no-hakidashi-ho" in Japanese) so that the regression coefficients (corrective coefficients) are obtained and printed. The procedure is repeated as many times as the number of the independent variables. And the regression coefficients (corrective coefficients) are printed.

As shown in FIG. 5, the history of the function values of the spindle rotation frequency for each time period from present to past in the address is stored from 512 to 0 of the historical data table 22D. The calculation of the function value of the spindle rotation frequency is based on the equation (1).

Here, the method to store the function value of the spindle with renewing the data table 22D one by one and at the same time calculating the moving averages("ryu-do heikin" in Japanese) will be explained. FIG. 6 shows the historical data table 22D after the renewal.

When power of the machine is turned on, as the spindle is not rotating before then, the function values for all lapse of time are initialized to zeros. Then, following calculations (1), (2), (3) are repeatedly performed every time. And when the power is turned off, the renewal of the data table 22D can not be conducted during the suspension of the power. But when the power is turned on again, the number of times corresponding to the suspension are renewed. And if the time of the suspension is longer than the period of the data table 22D, the function values for all lapse of time are initialized to zeros just as in the case of turning the power on.

(1) Calculation of the Sum

① A function value in the address 507 and a function value in the location number 508 are summed up and the total is stored in the memory $A_2$.

② A function value in the address 497 and a function value in the location number 499 are summed up and the total is stored in the memory $A_4$.

③ A function value in the address 481 and a function value in the location number 485 are summed up and the total is stored in the memory $A_8$.

④ A function value in the address 433 and a function value in the location number 441 are summed up and the total is stored in the memory $A_{16}$.

⑤ A function value in the address 353 and a function value in the location number 369 are summed up and the total is stored in the memory $A_{32}$.

(2) Shift

Five hundred and twelve function values beginning from the address 1 are shifted to the address 0.

(3) Calculation of the Average

① The value in the memory $A_2$ is divided by 2 and the quotient is written in the address 506.

② The value in the memory $A_4$ is divided by 2 and the quotient is written in the address 496.

③ The value in the memory $A_8$ is divided by 2 and the quotient is written in the address 480.

④ The value in the memory $A_{16}$ is divided by 2 and the quotient is written in the address 432.

⑤ The value in the memory $A_{32}$ is divided by 2 and the quotient is written in the address 352.

Incidentally, many available micro processing units for the computer (hereafter, it will be called MPU for short) are provided with a batch transfer function for its memory contents. It takes shorter time to carry out processing with the batch transfer function provided in the MPU than to make and use programs of reading out individual data from a source address and write in a destination address. But in this function, the processing is sequentially carried out from an address of a lower order to higher order. Accordingly when the range of address in source address is overlapped with the range of address in destination address and if the destination address is in a higher order than the order of the source address, the overlapped range area can not be processed correctly. To avoid this problem, the location numbers are allocated in a sequence reverse to the elapsed time in FIG. 5 and FIG. 6.

The effect of the embodiment of the present invention will be explained next.

When power of the horizontal boring machine 1 and the numeric control unit 2 is turned on and the horizontal boring machine 1 starts operating through a command from the numeric control unit 2, the coordinate values of each shaft driving system 18X, 18Y, 18Z are renewed and stored in the coordinate value table 22A and the function values of the rotation frequency of the spindle 16 are stored in the historical data table 22D.

All the while, the compensation procedures are carried out at every predetermined interval. The CPU 21 reads out each address and the corrective coefficient from the corrective coefficient table 22C with reference to the time of performing the compensation, and reads out the function values of each shaft rotation frequency in the address of the data table. After that, the CPU multiplies the function values of the spindle rotation frequency in the address and the corresponding corrective coefficients and obtains through calculation the compensation values based on the total sum of each product.

When compensating the three axes X, Y, Z, assuming that the function value of the spindle rotation frequency at the present time X0 related in the addresses from 512 to zero and the corresponding corrective coefficients of each axis are $R_{512}$, $b_{00x}$, $b_{00y}$, $b_{00z}$, the function value of the spindle rotation frequency at the period before X1 and the corresponding corrective coefficients of each axis are $R_{511}$, $b_{01x}$, $b_{01y}$, $b_{01z}$, the function value of the spindle rotation frequency at the period before X2 and the corresponding corrective coefficients of each axis are $R_{510}$, $b_{02x}$, $b_{02y}$, $b_{02z}$, ... the function value of the spindle rotation frequency at the period before X5 to X6 and the corresponding corrective coefficients of each axis are $R_{506}$, $b_{05x}$, $b_{05y}$, $b_{05}$, ... and the function value of the spindle rotation frequency as of the period before X481 to X512 and the corresponding corrective coefficients of each axis are $R_0$, $b_{32x}$, $b_{32y}$, $b_{32z}$, the amount of displacement for each axis, $\delta_X$, $\delta_Y$, $\delta_Z$ are calculated from the equation (4).

That is, the amount of displacement of $\delta_X$, $\delta_Y$, $\delta_Z$ is each calculated from following equations.

$$\delta_X = (R_{512} \times b_{00x} + R_{511} \times b_{01x} + R_{510} \times b_{02x} \ldots + R_{506} \times b_{05x} \ldots + R_0 \times b_{32x})/4194304$$

$$\delta_Y = (R_{512} \times b_{00y} + R_{511} \times b_{01y} + R_{510} \times b_{02y} \ldots + R_{506} \times b_{05y} \ldots + R_0 \times b_{32y})/4194304$$

$$\delta_Z = (R_{512} \times b_{00z} + R_{511} \times b_{01z} + R_{510} \times b_{02z} \ldots + R_{506} \times b_{05z} \ldots + R_0 \times b_{32z})/4194304$$

The compensation values $\epsilon_X$ ($=-\delta_X$), $\epsilon_y$ ($=-\delta_y$), $\epsilon_Z$ ($=-\delta_Z$) are calculated by substituting these displacement amounts $\delta_X$, $\delta_y$, and $\delta_Z$ into the equation (5).

For instance, when $R_{512}$, the function value of the spindle rotation frequency at the present time X0, is 5104, $b_{00x}$ the corresponding coefficient of X axis, is −2687, $b_{00y}$, the corresponding coefficient of Y axis, is −1080, and $b_{00z}$, the corresponding coefficient of Z axis, is 7450.

When $R_{511}$, the function value of the spindle rotation frequency at the period before X1, is 5104, $b_{01x}$, the corresponding coefficient of X axis, is 2525, $b_{01y}$, the corresponding coefficient of Y axis, is 425, and $b_{01z}$, the corresponding coefficient of Z axis, is −6467.

When the function value of the spindle rotation frequency at the period before X2, $R_{510}$ is 5104, the corresponding coefficient of X axis, $b_{02x}$ is 1178, the corresponding coefficient of Y axis, $b_{02y}$ is −206, and the corresponding coefficient of Z axis, $b_{02z}$ is −3456.

When $R_{506}$, the function value of the spindle rotation frequency at the period from X5 to X6, is 3065, $b_{05x}$, the corresponding coefficient of X axis, is 223, $b_{05y}$, the corresponding coefficient of Y axis, is 2000, and b05z, the corresponding coefficient of Z axis, is −3120.

When $R_0$, the function value of the spindle rotation frequency at the period from X481 to X512, is 0, $b_{32x}$, the corresponding coefficient of X axis, is 10, $b_{32y}$, the corresponding coefficient of Y axis, is 100, and b32z, the corresponding coefficient of Z axis, is −600. If these situations are assumed, the displacement amounts of the axes $\delta_X$, $\delta_y$, $\delta_Z$ are calculated as follows.

$$\delta_X = (5104 \times (-2687) + 5104 \times 2525 + 5104 \times 1178 \ldots + 3065 \times 223 \ldots + 0 \times 10)/4194304 = 10185628/4194304 = 2.428 [\mu m]$$

$$\delta_y = (5104 \times (-1080) + 5104 \times 425 + 5104 \times (-206) \ldots + 3065 \times 2000 \ldots + 0 \times 10)/4194304 = 23201458/4194304 = 5.532 [\mu m]$$

$$\delta_z = (5104 \times 7450 + 5104 \times (-6467) + 5104 \times (-3456) \ldots + 3065 \times (-3120) \ldots + 0 \times (-600))/4194304 = 65685732/4194304 = -15.661 [\mu m]$$

Accordingly the compensation values $\epsilon_X$, $\epsilon_y$, $\epsilon_Z$ are as follows.

$\epsilon_X = -2.428 [\mu m]$ $\epsilon_y = -5.532 [\mu m]$ $\epsilon_z = 15.661 [\mu m]$ In such a case that the corrective coefficient for the elapsed time corresponding to the time shown in FIG. 5 is not found in FIG. 3, the corresponding calculation is not given. For instance, the elapsed time corresponding to the elapsed time (from X12 to X13) for address 499 is not found in FIG. 3, the corresponding calculation is not given. But the value not used at that time will be used several times later due to the shift at every X1.

Thus, after the displacement amount in each axis $\delta_X$, $\delta_y$, $\delta_Z$ are calculated from the function values of the spindle rotation frequency $R_{512}$, $R_{511}$, $R_{510}$, ... $R_{506}$ ... $R_0$ for each time period from present to past and each corrective coefficient corresponding to the above period of time $b_{00x}$, $b_{01x}$, $b_{02x}$, ... $b_{05x}$ ... $b_{32x}$ $b_{00y}$, $b_{01y}$, $b_{02y}$, ... $b_{05y}$ ... $b_{32y}$ $b_{00z}$, $b_{01z}$, $b_{02z}$, ... $b_{05z}$ ... $b_{32z}$ the compensation values for each axis $\epsilon_X$, $\epsilon_y$, $\epsilon_Z$ are obtained by reversing the signs of the displacement amount $\delta_X$, $\delta_y$, $\delta_Z$. These compensation values $\epsilon_X$, $\epsilon_y$, $\epsilon_Z$ are renewed and memorized in the compensation table 22B.

Then, the NC command position commanded after the renewal is adjusted by the amount of compensation values $\epsilon_X$, $\epsilon_y$, $\epsilon_Z$ in the compensation value table 22B and the displacement amount in each axis is compensated by using the compensation value $\epsilon_X$, $\epsilon_y$, $\epsilon_Z$ memorized in the compensation value table 22B.

In the embodiment of the present invention, a history of function values of the spindle in each time period from present to past are stored in the historical data table 22D, and the corrective coefficients are stored in advance in the corrective coefficient table 22C relating the coefficients to the address in the historical data table 22D. In compensation procedure, the address and the corrective coefficient are read out from the corrective coefficient table and the function value of the spindle rotation frequency corresponding to each address is read out from the data table 22D. The compensation value is calculated from the function value of the spindle rotation frequency at the corresponding address and corrective coefficient corresponding to this function number. Thus, as the NC command position is compensated based on this compensation value, even when the spindle 16 is randomly rotated, the displacement resulting from centrifugal force and heat generation caused by rotation of the spindle 16 can be compensated accurately.

Figure 7:
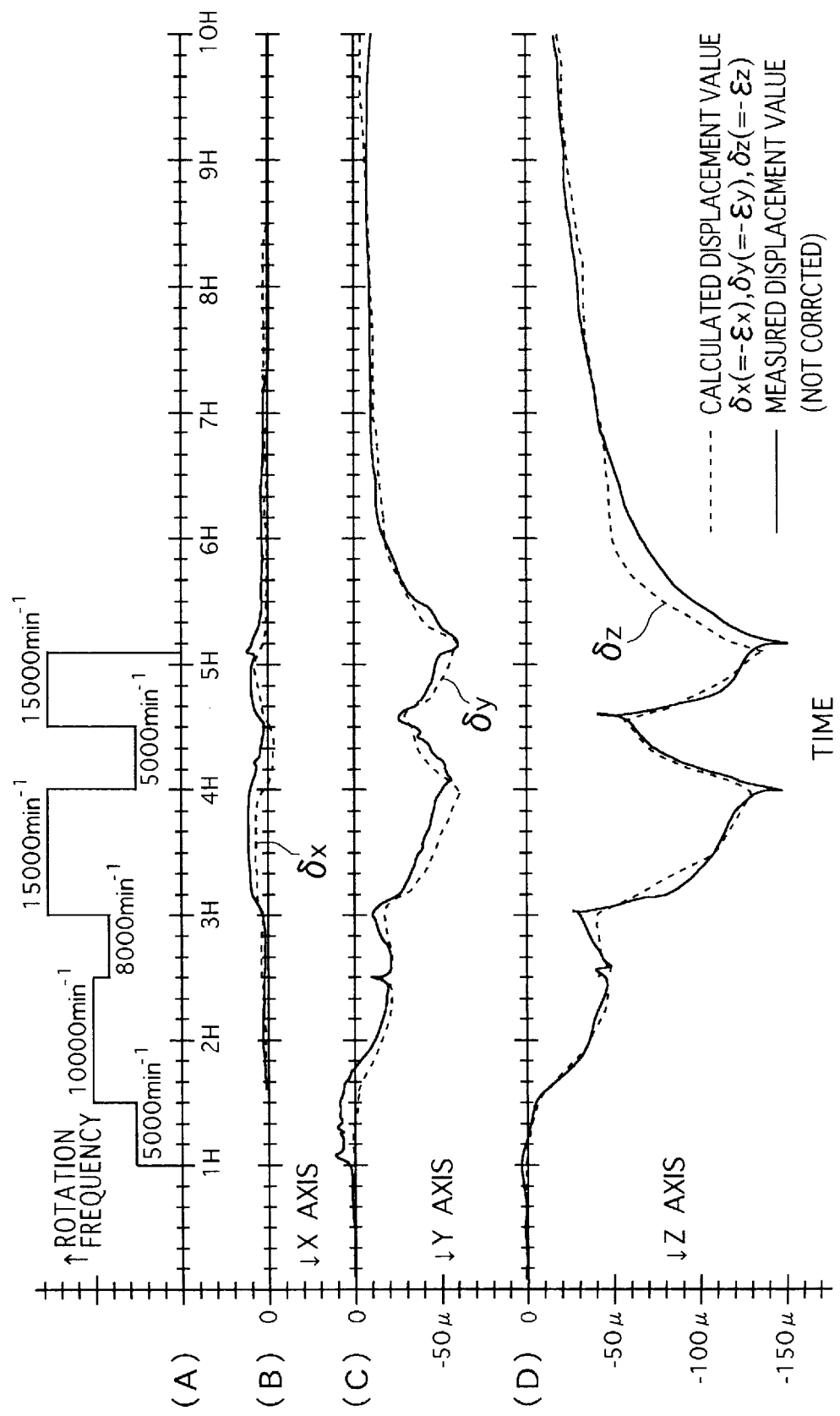
FIG. 7 is a graph showing the relations among changes of the rotation frequency of the spindle, the displacement amount obtained through the compensation computations (compensation value) and measured values of the displacement in the above embodiment.
Figure 8:
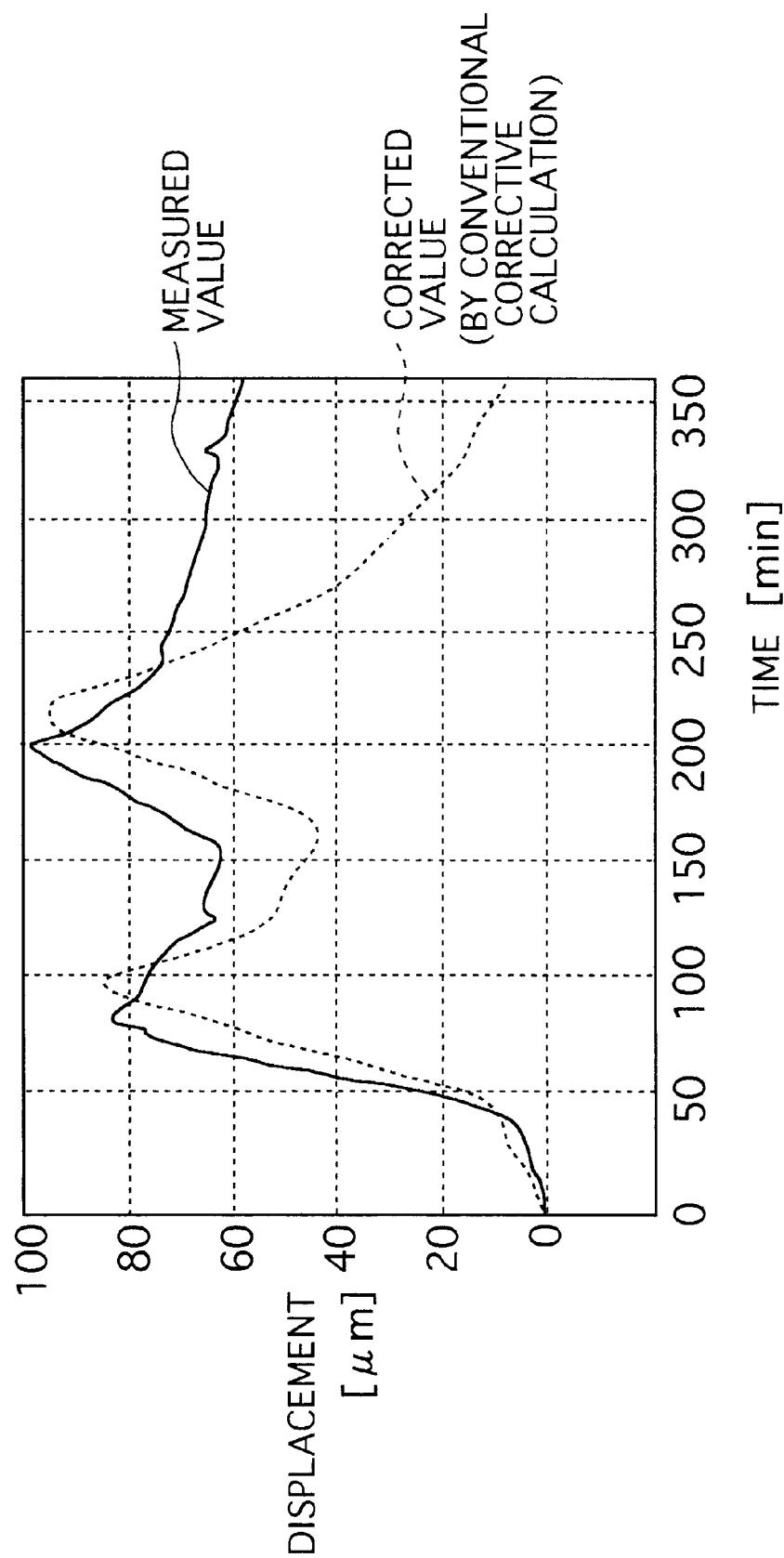
FIG. 8 is a graph showing the relations between the compensation values obtained through the conventional compensation method and the measured values.

For instance, when the spindle is rotated in a condition shown in FIG. 7(A), the measured displacement values of three axis X, Y, Z and the displacement amounts of each axis obtained from the compensation calculation in the embodiment of the present invention $\delta_X(=-\epsilon_X), \delta_y(=-\epsilon_y), \delta_z(=-\epsilon_z)$, are shown in FIG. (B), FIG. (C), and FIG. (D). As is clear from these figures, each displacement amounts $\delta_X(=-\epsilon_X), \delta_y(=-\epsilon_y)$, and $\delta_z(=-\epsilon_z)$ are very close to the measured values of displacement with little error, and it is apparent that the compensations of the NC command position based on the compensation values can achieve a high accuracy compensation, even when the spindle is randomly rotated.

The calculation of the compensation values $\epsilon_X, \epsilon_Y, \epsilon_Z$ are obtained from the following procedures. Assuming that the function values of the spindle in each time period from present to past are $R_{512}, R_{511}, R_{510}, \ldots R_{506} \ldots R_0$, the corrective coefficients are $b_{00X}, b_{01X}, b_{02X}, \ldots b_{32X}, b_{00y}, b_{01y}, b_{02y}, \ldots b_{05y}, b_{32y}, b_{00Z}, b_{01Z}, b_{02Z}, \ldots b_{05Z} \ldots b_{32Z}$, the displacement amounts $\delta_X, \delta_Y, \delta_Z$ are calculated from, $$\delta_X = (R_{512} \times b_{00X} + R_{511} \times b_{01X} + R_{510} \times b_{02X} \ldots + R_{506} \times b_{05X} \ldots + R_0 \times b_{32X})/4194304$$

$$\delta_y = (R_{512} \times b_{00y} + R_{511} \times b_{01y} + R_{510} \times b_{02y} \ldots + R_{506} \times b_{05y} \ldots + R_0 \times b_{32y})/4194304$$

$$\delta_Z = (R_{512} \times b_{00Z} + R_{511} \times b_{01Z} + R_{510} \times b_{02Z} \ldots + R_{506} \times b_{05Z} \ldots + R_0 \times b_{32Z})/4194304$$

Then, the compensation values $\epsilon_X, \epsilon_y, \epsilon Z_z$ are obtained by changing the sign of the displacement amounts $\delta_x, \delta_y, \delta_z$. Thus the compensation values $\epsilon_x, \epsilon_y, \epsilon_z$ can be obtained by such a very simple calculation.

With regard to X axis, for instance, the corrective coefficients $b_{00X}, b_{01X}, \ldots b_{04X}$ corresponding to each X1 time period from present before X4, corrective coefficients $b_{05X}, b_{06X}, \ldots b_{08X}$, corresponding to every X2 time period from X4 before X12, corrective coefficients $b_{09X}, b_{10X}, b_{11X}$ corresponding to every X4 time period from X12 before X24, corrective coefficients $b_{12X}, b_{13X}, \ldots b_{16X}$ corresponding to every X8 time period from X24 before X64, corrective coefficients $b_{17X}, b_{18X}, \ldots b_{20X}$ corresponding to every X16 time period from X64 before X128, corrective coefficients $b_{21X}, b_{22X}, \ldots b_{32X}$ corresponding to every X32 from X128 before X512 are respectively stored in the corrective coefficient table 22C. In other words, as the period of time becomes farther back, the corrective coefficient is taken with longer intervals, thus the corrective coefficients can be stored with a small memory capacity.

And as a value proportional to a square of the main valve rotation frequency, or a compensated value based on a value proportional to a square of the main valve rotation frequency with a compensation by other value, is used as a function value of the spindle rotation frequency to store in the historical data table 22D, a displacement resulting from centrifugal force and heat generation caused by the rotation of the spindle 16.

In the above described embodiment, the corrective coefficients are stored in every X1 from present till X4, and the corrective coefficients are stored in every X2 from more than X4 till X12, in every X4 from more than X12 till X24, in every X8 from more than X 24 till 64, in every X16 from more than X64 till X128, and in every X32 from more than X128 till X512 are respectively stored. But the time period for the corrective coefficients is not limited within the period written above, and any optional period of time may be used for storing the corrective coefficient.

For instance, if a method of storing the corrective coefficients in every one minute from zero minute to 512 minutes ago, is adopted, the corrective coefficient table 22C needs more than 15 times as large a memory capacity and also needs more than 15 times as large a multiplication and addition circuit to calculate the displacement amount and the compensation value. But the advantage is that the aforementioned calculation of the sum (1) and calculation of the average is unnecessary, and the program for the compensation is simplified.

In the above described embodiment, the compensation value is calculated using the function value of the spindle rotation frequency, but direct use of the spindle rotation frequency for the calculation also gives compensation values with improved accuracy than that of the conventional heat displacement compensation method.

By the heat displacement compensation apparatus of machine tools according to the present invention, displacement resulting from centrifugal force and heat generation caused by rotation of the spindle, can be compensated with high accuracy, even when the spindle is randomly rotated.

Industrial availability

The present invention is best suited for compensating the displacement resulting from rotation of the spindle of a machine tool such as a horizontal boring machine and a milling machine which uses rotation of the spindle for processing.

What is claimed is:

1. A displacement compensation apparatus for machine tools to compensate the displacements that occurs from centrifugal force or heat generation caused by the rotation of a spindle in a machine tool, comprising:

a history file of data table which stores function values of the spindle rotation frequency in a plurality of time periods from present to past;

a corrective coefficient table in which correction coefficients are stored in a compensation process means, and wherein said compensation process means is for reading out each location and the corrective coefficient corresponding to each location from the corrective coefficient table, concurrently reading out the function value for the spindle rotational frequency at each location from the historical data table, calculating a compensation value from the function value at each location and the corresponding corrective coefficient, and compensating a command position of each shaft in the machine based on the calculated compensation values.

2. The displacement compensation apparatus for machine tools according to claim 1, wherein said compensation process means determines the compensation value $\epsilon$ by changing signs of displacement amounts $\delta$ calculated from the following equation $$\delta = R(k_{00}) \times b_{00} + R(k_{01}) \times b_{01} + R(k_{02}) \times b_{02} \ldots + R(k_m) \times b_m$$

where $k_{00}, k_{01}, k_{02} \ldots k_m$ is location respectively read out from said corrective coefficient table, $b_{00}, b_{01}, b_{02}, \ldots b_m$ is each corrective coefficient corresponding to the location, and the function value of the spindle rotation frequency in each location read from the historical data table is $R(k_{00})$, $R(k_{01}), R(k_{02}) \ldots R(k_m)$.

3. The displacement compensation apparatus for machine tools according to any one of claims 1 or 2, wherein said corrective coefficient is determined by collecting and memorizing measured data of displacement of the spindle, shaft rotation time data and rotation frequency data while the spindle is rotated with randomly changing the rotation frequency of the spindle and by processing regression calculations based on the data.

4. The displacement compensation apparatus for machines tools according to claim 1, wherein said function value is a value proportional to the square of the spindle rotation frequency, or a value based on the value proportional to the square of the spindle rotation frequency with a compensation by another value.

5. The displacement compensation apparatus for machine tools according to claim 1, wherein the history of the function value in said historical data table is memorized at intervals of a relatively short period of time while the spindle is in rotation and at intervals of a relatively long period of time while the rotation of the spindle is suspended.

6. The displacement compensation apparatus for machine tools according to claim 1, wherein said locations in the historical data table are arranged in an order reverse to elapsed time.

7. The displacement compensation apparatus for machine tools according to claim 1, wherein a moving average of the function values at a plurality of predetermined locations during a certain past period of time is stored in said historical data at a data renewal; and wherein a corrective coefficient corresponding to the above period of time is stored in said corrective coefficient table.

8. The displacement compensation apparatus for machine tools according to claim 1, wherein the rotation frequency of the spindle is used instead of the function value of the rotation frequency of the spindle for calculating the compensation value.

* * * * *

UNITED STATES PATENT AND TRADEMARK OFFICE
CERTIFICATE OF CORRECTION

PATENT NO. : 6,341,245 B1
DATED : January 22, 2002
INVENTOR(S) : Toshihiro Ueta et al.

It is certified that error appears in the above-identified patent and that said Letters Patent is hereby corrected as shown below:

<u>Column 12,</u>
Line 65, "machines tools" should read -- machine tools --.

Signed and Sealed this

Thirtieth Day of April, 2002

Attest:

Attesting Officer

JAMES E. ROGAN
*Director of the United States Patent and Trademark Office*